R. L. BAILEY.
VARIABLE SPEED TRANSMISSION MECHANISM FOR MOTOR CYCLES.
APPLICATION FILED MAY 6, 1912.
1,110,249.
Patented Sept. 8, 1914.
2 SHEETS—SHEET 1.
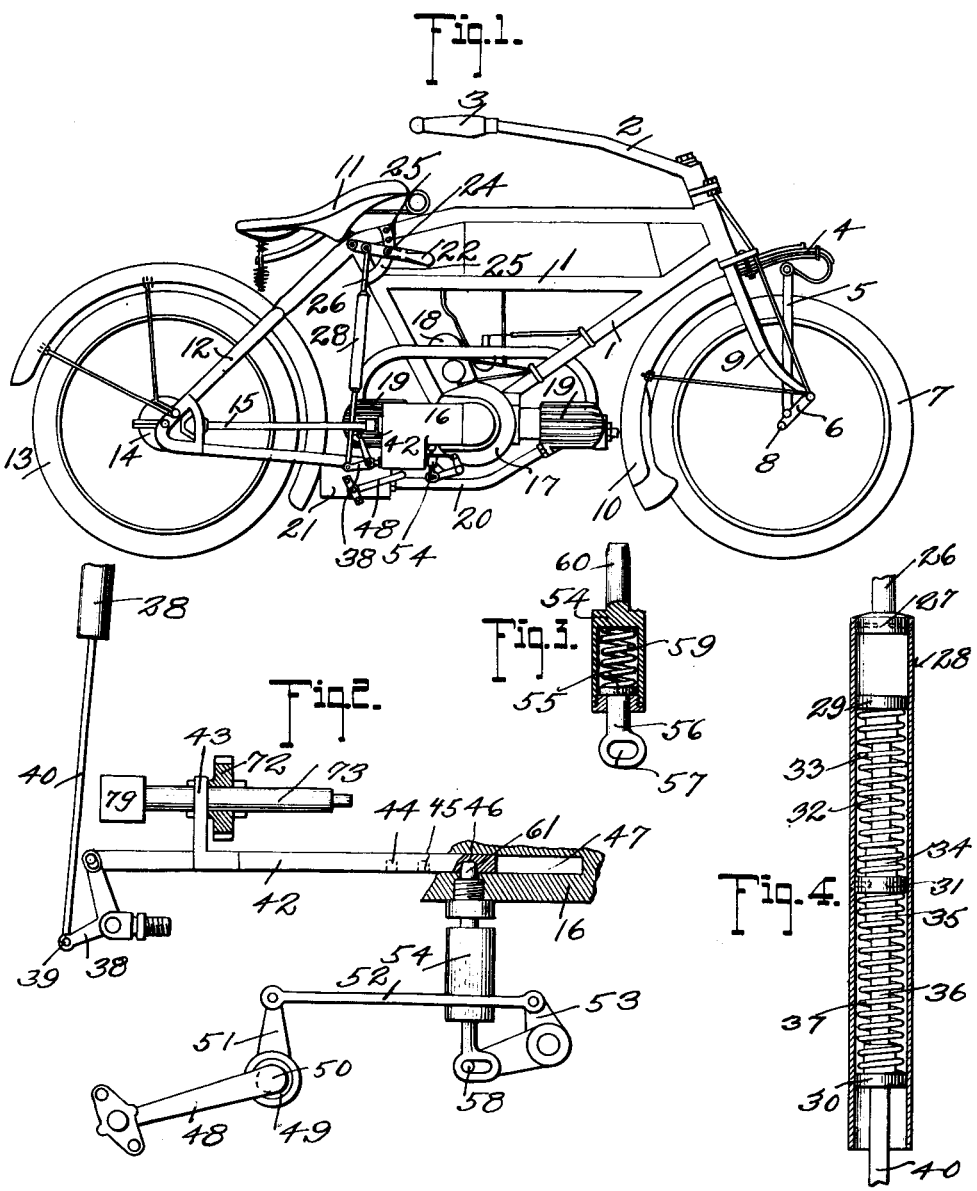
Witnesses
E. H. Wagner
D. E. Burdine
Inventor
Robert L. Bailey
By J. F. Robb
Attorney R. L. BAILEY.
VARIABLE SPEED TRANSMISSION MECHANISM FOR MOTOR CYCLES.
APPLICATION FILED MAY 6, 1912.
1,110,249.
Patented Sept. 8, 1914.
2 SHEETS—SHEET 2.
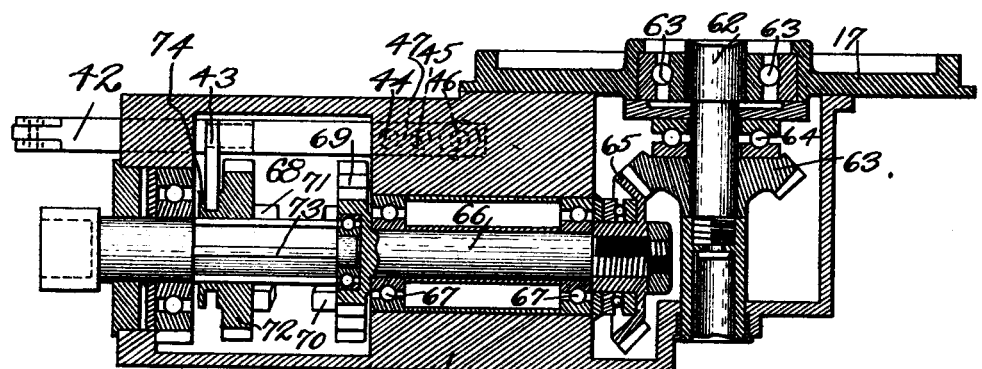
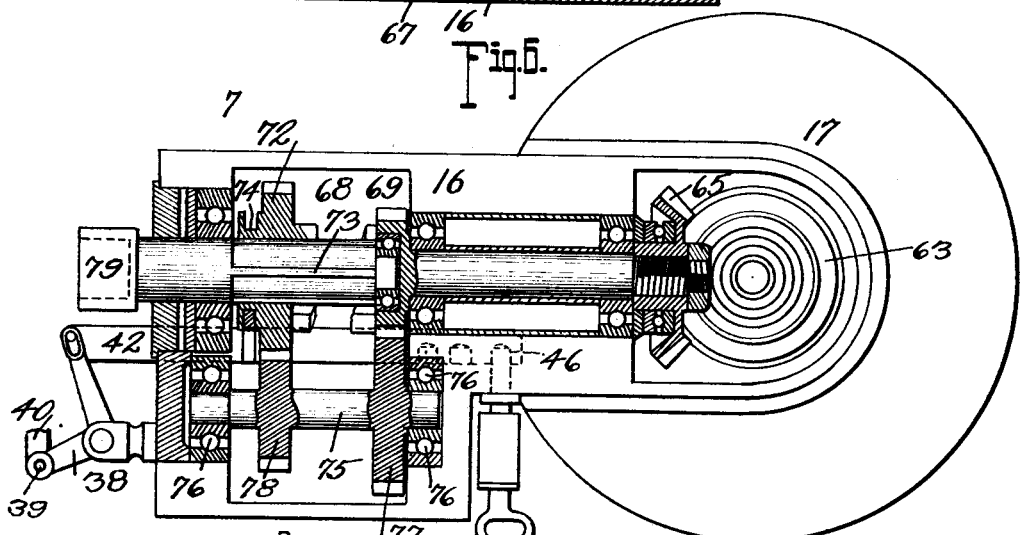
Inventor
Robert L. Bailey
By J. F. Robb
Attorney
Witnesses
C. H. Wagner
D. E. Burdine

UNITED STATES PATENT OFFICE.

ROBERT L. BAILEY, OF PORTLAND, OREGON, ASSIGNOR TO A. L. MacLEOD, OF PORTLAND, OREGON.

VARIABLE-SPEED TRANSMISSION MECHANISM FOR MOTOR-CYCLES.

1,110,249.      Specification of Letters Patent.      Patented Sept. 8, 1914.

Original application filed February 19, 1912. Serial No. 678,472. Divided and this application filed May 6, 1912. Serial No. 695,407.

*To all whom it may concern:*

Be it known that I, ROBERT L. BAILEY, a citizen of the United States, residing at Portland, in the county of Multnomah and State of Oregon, have invented certain new and useful Improvements in Variable-Speed Transmission Mechanism for Motor-Cycles, of which the following is a specification.

This invention relates to motor cycles and covers certain features disclosed in my application filed February 19, 1912, Serial Number 678,472, from which application the present one is a division.

The object of the invention is to effect the transmission for both high and low speeds by pressure exerted forwardly and rearwardly on the pedals, and to provide for the different transmissions by the provision of a lever which is located adjacent to the saddle, which lever coacts with mechanism operated by such forward and rearward pressure on the pedals.

A further object of the invention is to provide yieldable connections for the transmission means, whereby the parts may be held in their adjusted positions, regardless of the vibration and strain to which the motor cycle is subjected during riding.

For a full understanding of the present invention, reference is to be had to the following description and to the accompanying drawings, in which—

Figure 1 is a side elevation of a complete motor cycle showing the relative positions of the particular features which comprise the present invention. Fig. 2 is a detail view representing the connections between the pedals and the transmission shifting devices. Fig. 3 is a detail view of the spring barrel and plunger shown in Fig. 2, and hereinafter referred to, a portion thereof being shown in section. Fig. 4 is a detail view of the spring barrel which connects with the shifting lever, also hereinafter referred to. Fig. 5 is a horizontal sectional view taken through the transmission gear casing. Fig. 6 is a vertical sectional view through the same. Fig. 7 is a detail sectional view through a portion of the transmission casing showing the gear shifting device.

Throughout the following detail description and on the several figures of the drawings, similar parts are referred to by like reference characters.

Before describing particularly the features which are specifically claimed in the present application, I will first refer to and give a brief description of some of the ordinary parts of a motor cycle, to which my invention may be applied.

The main frame of the machine is denoted by 1; 2 indicates the handle bars; 3 the gripping portions of the latter; 4 a flat leaf spring; 5 a false fork, and 6 a rocker arm, to a portion of which said false fork is attached, as is clearly indicated in the drawings. The other end of the member 5 is attached to the flat leaf spring 4, the purpose of this arrangement being to afford flexibility to the front portion of the machine, and thereby rendering riding thereof easy. The axle of the front wheel 7 is denoted by 8, and 9 represents the main front fork of the machine which is bifurcated, as usual, one portion passing to each side of the wheel.

10 represents the mud-guard; 11 the saddle of ordinary construction, and 12 is the rear fork. The rear wheel is denoted by 13, the same being journaled in the gear housing or casing 14, and 15 is the housing for the drive shaft which communicates with the casing or housing 14.

16 represents the transmission casing, into which the shaft housing 15 enters; 17 represents the crank casing, and 18 is the magneto, the latter being of any preferred construction and it not being necessary for the purposes of the present disclosure, to illustrate it in detail.

19 represent the engine cylinders; 20 is the exhaust manifold which leads directly to the muffler 21. The above is believed to complete a description of the necessary parts of a motor cycle so as to give a better understanding of the exact manner in which the particular movements, which will now be described, are mounted with reference to the general structure.

To a portion of the main frame 1, adjacent to the saddle, I pivot a lever 22, which so swings relatively to a sector 23 that a pin 24 on the lever will fit into any one of three openings 25 provided in the sector, the same corresponding to high speed, low speed, and neutral. To a portion of the lever 22 adjacent to its pivotal connection with the main frame, a rod 26 is pivotally connected, which rod has at its lower end a head 27 connected with a spring barrel 28, illustrated in Fig. 1, and particularly in Fig. 4. The spring barrel 28 has movable therein the plungers 29 and 30, and is provided intermediate the two plungers with a fixed collar 31. A rod 32 surrounded by a spring 33 connects the plunger 29 and fixed collar 31, the rod 32 being movable in a sleeve 34 connected with the collar. A second sleeve 35 is connected with the collar on its lower side, and a rod 36 which is connected with the plunger 30 and surrounded by a spring 37, is movable in the sleeve 35. The particular purpose of the arrangement of the spring barrel with its plungers and springs may best be referred to hereinafter, after the connections therebetween and the transmission drive have been particularly described.

To a suitable point on the transmission casing 16, is pivoted a bell crank lever 38, the end 39 of which is pivotally connected with a rod 40, which latter is fixedly connected with the plunger 30 slidable in the spring barrel 28. The upper end 41 of the bell crank lever is connected by means of a slot with a rod 42, carrying a yoke 43, the forward extremity of the rod 42 being provided with three slots or recesses 44, 45 and 46, which respectively correspond to low speed, neutral, and high speed. This recessed portion of the arm 42 slides within a channel 47 which is formed near one side of the transmission casing 16, the particular arrangement being best shown in Fig. 2 and the relative mounting of the arm 42 with reference to the casing 16 being best shown in Figs. 5 and 6.

The connections between the transmission means and pedals will now be described. 48 denotes the pedals having suitable bearings at 49, and to the central pedal shaft 50, an upstanding crank 51 is rigidly connected, a rod 52 connecting the latter with a bell crank lever 53 which may be pivoted in any suitable location, but is shown in the drawings as located below the crank casing 17. A spring barrel 54 is disposed below that portion of the transmission casing 16 in which the rod 42 slides, said casing 54 containing a plunger 55 connected by means of a rod 56 having a slotted end 57 with a pin 58 on one end of the bell crank lever 53. A spring 59 located above the plunger 55 tends to force the latter to the bottom of the barrel and normally maintain it in such position. The spring barrel 54 has connected to its upper portion a rod 60, which is provided at its end 61 with a pin adapted to enter any one of the slots or recesses 44, 45 or 46, formed in the arm 42. When forward pressure is exerted on the pedals, the pressure will communicate movement through the crank 51, rod 52, bell crank lever 53 and rod 56 to the plunger 55, thus compressing the spring 59 above the plunger, which will result in the barrel 44 being raised upwardly so that the pin 61 may be maintained in engagement with one of the slots in the arm 42 before referred to. By this means, a yielding connection between the rod 42 and the pedals 48 is effected with the result that the engagement of the recesses 44, 45 and 46 with the arm 60 will not be affected by the vibration of the parts.

In the crank casing 17, a shaft 62 is journaled, the same having roller bearings 63, and this shaft being driven in a suitable manner from the engines. The shaft 62 has mounted on a portion thereof which enters the transmission casing, a bevel gear 63 having roller bearings 64, the bevel gear meshing with a drive gear 65 which is also a bevel gear mounted on a drive shaft 66, journaled longitudinally through the transmission casing and provided with roller bearings 67. The transmission casing is provided at its rear portion with a hollow chamber 68, in which the gear shifting devices are arranged. In this chamber, mounted on the rear end of the drive shaft 66, is a spur gear 69 having jaws 70 adapted to engage the jaws 71 formed on a spur gear 72, which latter is splined to the shaft 73, which shaft is free from the shaft 66. The spur gear 72 is movable to and fro on the shaft 73 so that it may engage the spur gear 69 by means of the jaws formed on the two wheels and for this purpose the yoke 43, hereinbefore referred to, as mounted on the rod 42, which rod passes through the transmission casing, as will be seen on particular reference to Fig. 5, engages the hub portion 74 of the spur gear 72. It will thus be seen that as the rod 42 is moved to and fro so that either of its slots 44, 45 and 46 engages the pin 61, the spur gear 72 will either be in the position shown in Figs. 5 and 6, or it will have a neutral intermediate position, or it will engage the spur gear 69 by means of the jaws before referred to. At the latter phase of their relative positions, a direct drive is obtained, the shaft 73 rotating with the shaft 66 and high speed being obtained. In the lower portion of the chamber 68, a countershaft 75 is mounted on ball bearings 76, and two spur gear wheels 77 and 78 are fixedly mounted on the shaft 75 so that they rotate in unison with the same at all times. The spur gear 77 is normally in engagement with the gear 69, and when the spur gear 72 is in the position shown in Figs. 5 and 6, it will mesh with the gear 78. The ratios of the gears are such that low speed will be obtained when the gears 72 and 78 mesh, the gear 77 having more teeth than the gear 69, the gear 78 having less teeth than the gear 77, and the gear 72 having more teeth than the gear 78. The outer portion 79 of the shaft 73 will enter the shaft casing 15 as will be obvious in order to impart rotation to the rear wheel of the machine.

The lever 22 being in engagement with the lowermost of the three openings formed in the sector with which it coöperates, and which lower opening corresponds with high speed, it will be seen that by upward movement of the lever, the head 27 at the lower end of the rod 26 will raise the spring barrel 28, which will result in compressing the spring 38. The rod 40 connected with the plunger 30 is, however, held in a fixed position with reference to the upward movement of the spring barrel 28, inasmuch as the rod 42 is held in engagement by means of one of its slots or recesses with the pin 61 on the end of the arm 60. The spring 37 will thus be placed under tension during upward movement of the member 28, since the head 30 maintains a fixed position. This will result in energy being stored up within the spring barrel 28, which will be available for use for moving the rod 42 through its connection with the rod 40 as soon as back pressure is exerted on the pedals 48. This back pressure results in the disengagement of the pin 61 with the one of the slots of the rod 42 with which it is in engagement, inasmuch as compression of the spring 59 in the spring barrel 54 will be relieved and allow the barrel to move downwardly. It will be seen by this means that an automatic change from high speed to low speed, or from either to neutral can be obtained by moving the lever 22 to a selected position, and pressure on the pedals in the manner hereinbefore described being utilized to effect the particular transmission desired. When the lever 22 is moved to a downward position, the effect will be the same as in the illustration just made with reference to the upward movement of the lever, the force of the compressed springs being always utilized to move the rod 42 to and fro in the channel 47 in order that one of its slots may engage the pin 61 for the desired result.

I wish it understood that I am not limited in the use of the transmission device above described to its application to a motor cycle, as the same may be applied to other types of motor vehicles without any modification whatever of the operative parts of the device. It is evident that various modifications may be made in the arrangement of the parts without departing from the spirit of the invention and such modification in the arrangement of the parts constitutes all that is necessary to adapt the device to other forms of vehicles than that illustrated and described. For instance, the lever 22 may be arranged in any convenient position in any form of motor vehicle provided that it is within the reach of the operator and the same is true of the pedals 48.

Having thus described the invention, what is claimed as new is:

1. The combination, in a transmission device, of a drive shaft, a lever movable to a selected position, means coöperating with said lever for storing up energy adapted to be exerted in either direction of movement of the lever, a rod connected with said means, mechanism operated by the movement of said rod coöperating with said drive shaft to effect the change of speed, means engaging said rod to hold the same against movement, and means for shifting said engaging means out of engagement for releasing the rod and permitting movement thereof to a position corresponding with the desired speed.

2. The combination, with a drive shaft and a driven element, of shiftable power transmission means adapted to be reciprocally shifted to a plurality of positions for transmission of power at variable speeds, means for shifting said transmission means, means for storing power for exerting pressure on said transmission shifting means while the transmission means is positioned for transmitting power at one speed tending to shift the same in either direction of movement of the transmission shifting means to a position for transmitting power at another speed, and releasable locking means for locking the transmission shifting means against action.

3. The combination, with a drive shaft and a driven element, of shiftable power transmission means adapted to be reciprocally shifted to a plurality of positions for transmission of power at variable speeds, means for shifting said transmission means, means for storing power for exerting pressure on said transmission shifting means while the transmission means is positioned for transmitting power at one speed tending to shift the same in either direction of movement of the transmission shifting means to a position for transmitting power at another speed, releasable locking means for locking the transmission shifting means against action, and means for releasing the locking means.

4. The combination, in a transmission device, of a drive shaft, a lever movable to a selected position, means coöperating with said lever for storing up energy adapted to be exerted in either direction of movement of the lever, a rod connected with said means, mechanism operated by the movement of said rod coöperating with said drive shaft to effect the change of speed, means engaging said rod to hold the same after it has been moved to a position to correspond with the desired speed, and means including pressure members coöperating with said last named means to render the latter operative on the application of pressure to said pressure members.

5. The combination of a drive shaft, a pivoted lever movable to a selected position, means comprising springs and plungers coöperating with said lever for storing up energy adapted to be exerted in either direction of movement of the lever, a rod connected with said means, mechanism operated by the movement of said rod coöperating with said drive shaft to effect the change of speed, means engaging said rod to hold the same after it has been moved to a position to correspond with the desired speed, and means coöperating with said last named means to render the latter operative.

6. The combination, in a transmission device, of a drive shaft, a lever movable to a selected position, means comprising springs and plungers coöperating with said lever for storing up energy adapted to be exerted in either direction of movement of the lever, a rod connected with one of the plungers, a transmission casing through a portion of which said rod passes, and in which said drive shaft is journaled, mechanism operated by the movement of said rod coöperating with said drive shaft to effect the change of speed, yieldable means engaging said rod to hold the same after it has been moved to a position to correspond with the desired speed, and means including pressure members coöperating with said last named means to render the latter operative on the application of pressure to said pressure members.

7. The combination, in a transmission device, of a drive shaft, a pair of shafts one of which is normally driven from said drive shaft and the other of which is loose with relation to the drive shaft, a lever movable to a selected position, means coöperating with said lever for storing up energy adapted to be exerted in either direction of movement of the lever, a rod connected with said means, means between said drive shaft and said pair of shafts whereby the loose shaft may be driven directly from the drive shaft, or from said normally driven shaft to effect change of speed, and means engaging said rod to hold the same after it has been moved to a position to correspond with the desired speed.

8. The combination, in a transmission device, of a drive shaft, a pair of shafts, one of which is normally driven from said drive shaft and the other of which is loose, a sector having a plurality of openings, a lever movable to a selected one of said openings. means coöperating with said lever including springs and plungers for storing up energy adapted to be exerted in either direction of movement of the lever, a rod connected with one of said plungers, means between said drive shaft and said pair of shafts whereby the loose shaft may be driven directly from the drive shaft or from said normally driven shaft to effect the change of speed, means engaging said rod to hold the same after it has been moved to a position to correspond with the desired speed, and means coöperating with said last named means to render the latter operative on the application of pressure to said coöperating means.

9. The combination of a transmission casing, a drive shaft journaled therein, a pair of shafts also journaled in the transmission casing, one of which is normally driven from said drive shaft and the other of which is loose, a pivoted lever movable to a selected position, means coöperating with said lever for storing up energy adapted to be exerted in either direction of movement of the lever, a rod connected with said means, said rod entering a portion of said transmission casing, means between said drive shaft and said pair of shafts whereby the loose shaft may be driven directly from the drive shaft or from said normally driven shaft to effect the change of transmission, means engaging said rod to hold the same after it has been moved to a position to correspond with the desired transmission, and means including pedals coöperating with said last named means to render the latter operative on the application of pressure to the pedals.

10. The combination, in a transmission device, of a drive shaft, a lever movable to a selected position, a casing connected to and movable with said lever, springs and plungers arranged within said casing for storing up energy when the lever and casing are moved adapted to be exerted in either direction of movement of the lever, a rod connected with one of the plungers in said casing, mechanism operated by the movement of said rod coöperating with said drive shaft to effect the change of speed, and means engaging said rod to hold the same after it has been moved to a position to correspond with the desired speed.

11. The combination, in a transmission device, of a drive shaft, a lever movable to a selected position, a casing connected to and movable with said lever, springs and plungers arranged within said casing for storing up energy when the lever and casing are moved adapted to be exerted in either direction of movement of the lever, a transmission casing in which said drive shaft is journaled, a rod connected with one of the plungers in said casing, said rod being movable through a portion of said transmission casing, mechanism operated by the movement of said rod coöperating with said drive shaft to effect the change of transmission, yieldable means engaging said rod to hold the same after it has been moved to a position corresponding with the desired transmission, and means including pressure members coöperating with said last named means to render the latter operative on the application of pressure to said pressure members.

12. The combination, in a transmission device, of a drive shaft, a lever movable to a selected position, a casing connected to and movable with said lever, springs and plungers arranged within said casing for storing up energy when the lever and casing are moved adapted to be exerted in either direction of movement of the lever, a rod connected with one of the plungers in said casing, a pair of shafts, one of which is normally driven from said drive shaft and the other of which is loose, means between said drive shaft and said pair of shafts whereby the loose shaft may be driven directly from the drive shaft or from said normally driven shaft to effect the change of speed, means engaging said rod to hold the same after it has been moved to a position to correspond with the desired speed, pressure members, and connections between the latter and said last named means to render the latter operative on the application of pressure to the pressure members.

13. In a motor cycle, the combination of a drive shaft, a lever movable to a selected position, a casing connected to and movable with said lever, springs and plungers arranged within said casing for storing up energy when the lever and casing are moved adapted to be exerted in either direction of movement of the lever, a rod connected with one of the plungers in said casing, a pair of shafts, one of which is normally driven from said drive shaft and the other of which is loose, means between said drive shaft and said pair of shafts whereby the loose shaft may be driven directly from the drive shaft or from said normally driven shaft to effect the change of transmission, means engaging said rod to hold the same after it has been moved to a position to correspond with the desired transmission, and means including the pedals of the machine coöperating with said last named means to render the latter operative on the application of pressure to said pressure members.

14. The combination of a frame, a drive shaft, a sector provided with a plurality of apertures, and a lever movable to engage a selected one of said apertures, means coöperating with said lever for storing up energy adapted to be exerted in either direction of movement of the lever, said means comprising springs and plungers, a rod connected with said means, mechanism operated by the movement of said rod coöperating with said drive shaft to effect the change of speed, means engaging said rod to hold the same after it has been moved to a position to correspond with the desired speed, pedals mounted in the frame, and rods and levers connecting said pedals and said last named means to render the same operative on the application of pressure to the pedals.

15. The combination, in a transmission device, of a drive shaft, a lever movable to a selected position, a rod connected with said lever, a casing connected with said rod, a pair of plungers arranged in said casing, spring connections between said plungers, a rod connected with one of said plungers, mechanism operated by the movement of said rod coöperating with said drive shaft to effect the change of transmission, and means engaging said rod to hold the same after it has been moved to a position to correspond with the desired transmission, the plunger in said casing which is connected with said second named rod being held in a fixed position with relation to the movement of the casing in either direction of movement of the lever, and being movable in said casing by the energy accumulated therein after the release of said last named rod from its selected position.

16. The combination, in a transmission device, of a drive shaft, a pair of shafts, one of which is normally driven from said drive shaft and the other of which is loose with relation thereto, a lever movable to a selected position, a rod connected to said lever and movable therewith, a casing connected to said rod, a pair of plungers arranged in said casing and movable therein, spring connections between said plungers, a rod connected with one of said plungers, means between said drive shaft and said pair of shafts whereby the loose shaft may be driven directly from the drive shaft or from said normally driven shaft to effect the change of transmission, and means engaging said rod to hold the same after it has been moved to a position to correspond with the desired transmission, the plunger in said casing connected with said second named rod being held in a fixed position with relation to the movement of the casing while said last named rod is held in its selected position, and being movable in said casing in either direction of movement of the lever by the energy accumulated when the latter rod is released from its selected position.

17. The combination, in a transmission device, of a drive shaft, a pair of shafts, one of which is normally driven from said drive shaft and the other of which is loose with relation thereto, a lever movable to a selected position, means coöperating with said lever for storing up energy adapted to be exerted in either direction of movement of the lever, a rod connected with said means, connections between said rod and said loose shaft whereby the latter may be driven directly from the drive shaft or from said normally driven shaft to effect the change of speed, said rod being provided with a plurality of recesses, each to correspond with a particular speed desired, a movable member adapted to engage one of said recesses to hold the rod in a fixed position, means adapted to move said member, pressure members, and connections between said first named member and said pressure members whereby the former may be operated when pressure is exerted on said pressure members.

18. The combination of a drive shaft, a pair of shafts, one of which is normally driven from said drive shaft and the other of which is loose, a lever, a plate provided with a plurality of apertures in a selected one of which said lever may engage, means coöperating with said lever for storing up energy adapted to be exerted in either direction of movement of the lever, said means being yieldable, a rod connected with said means, a yoke arranged on said rod, a wheel movable on said loose shaft, with which said yoke engages, a wheel on said normally driven shaft adapted to engage said first named wheel, the arrangement being such that either high speed, low speed, or neutral may be obtained according to the connections between said wheels and said shafts, and means engaging said rod to hold the same after it has been moved to a position to correspond with the desired speed, said rod being movable with relation to said energy storing means by the accumulation of the energy stored therein when the rod has been released from its selected position.

19. The combination of a drive shaft, a pair of shafts, one of which is normally driven from said drive shaft and the other of which is loose, a lever movable to a selected position, and means for maintaining the lever in said selected position, means coöperating with said lever for storing up energy adapted to be exerted in either direction of movement of the lever, said means comprising springs and plungers, a rod connected with one of said plungers, connections between said rod and said loose shaft whereby the latter may be driven directly from the drive shaft or from said normally driven shaft to effect the change of speed desired, a transmission casing in which said rod is movable and in which said shafts are journaled, said rod being provided with a plurality of recesses to correspond with the desired speed, a member adapted to engage one of said recesses to hold the rod in a selected position, pedals, and connections between said pedals and said member whereby the latter may be operated to engage one of said recesses when pressure is exerted on the pedals.

20. The combination, with driving means and a driven element, of means for transmission of power variably from the driving means to the driven element, means for controlling changing of speed of said transmission means including energy storing means coöperating with said variable speed transmission means to effect change thereof in either direction, and releasable locking means operable independently of said controlling means for locking the energy storing means in a condition of stored energy.

21. In a motor cycle, transmission devices, speed changing means coacting therewith and movable in opposite directions, and energy storing means coacting with said speed changing means to effect the change of speed in either direction of movement of the changing means aforesaid.

22. The combination, with driving means and a driven element, of variable speed transmission means adapted to transmit power from the driving means to the driven element, said transmission means being shiftable for varying the speed of transmission, means for controlling the shifting of said variable speed transmission means including energy storing means coöperating with said variable speed transmission means for effecting speed changing shifting thereof in either direction subject to the control of said controlling means, and releasable locking means for locking the energy storing means operable independently of said controlling means in a condition of stored energy.

23. In a motor cycle, transmission devices, speed changing means coacting therewith and movable in opposite directions, pedals, means for controlling said speed changing means from the pedals, and energy storing means coacting with said speed changing means to effect the change of speed in either direction of movement of the changing means aforesaid.

24. The combination of transmission devices, speed changing means coacting therewith, foot levers, means for controlling said speed changing means from the foot levers, and energy storing means coacting with said speed changing means and with said controlling means and operative after the movement of the latter to effect the change of speed.

25. In a motor cycle, transmission devices, speed changing means coacting therewith, an operating rod for shifting the speed changing means in either direction of its movement, plungers connected with the rod, springs disposed on opposite sides of the plungers, an actuator connected with the springs and adapted to impart thrusts thereto in either of the directions of movement of the rod for storing up energy tending to move the rod in either direction according to the direction of movement of the actuator, and means for releasably locking the rod against movement under such tendency.

26. In a motor cycle, power transmission means, speed controlling means therefor, means for storing power for affecting the speed controlling means, means for locking the speed controlling means against being affected by the power storing means, and means for releasing the locking means.

27. In a motor cycle, power transmission means, speed changing means therefor, means for storing power for shifting the speed changing means, means for locking the speed changing means against shifting, and means for releasing the locking means.

28. In a motor cycle, power transmission means, speed changing means therefor, means for storing power for shifting the speed changing means, means for locking the power storing means in the power stored condition, means for locking the speed changing means against shifting, and means for releasing the locking means.

In testimony whereof I affix my signature in presence of two witnesses.

ROBERT L. BAILEY.

Witnesses:
JAMES O'CONNOR,
E. H. F. HORNER.